Dec. 12, 1950   R. B. HITCHCOCK   2,533,804
TRACTOR MOWER HITCH
Filed Sept. 11, 1944   3 Sheets-Sheet 2

Inventor:
Rex B. Hitchcock,
By Paul O. Pippel
Attorney.

Dec. 12, 1950      R. B. HITCHCOCK      2,533,804
TRACTOR MOWER HITCH
Filed Sept. 11, 1944      3 Sheets-Sheet 3
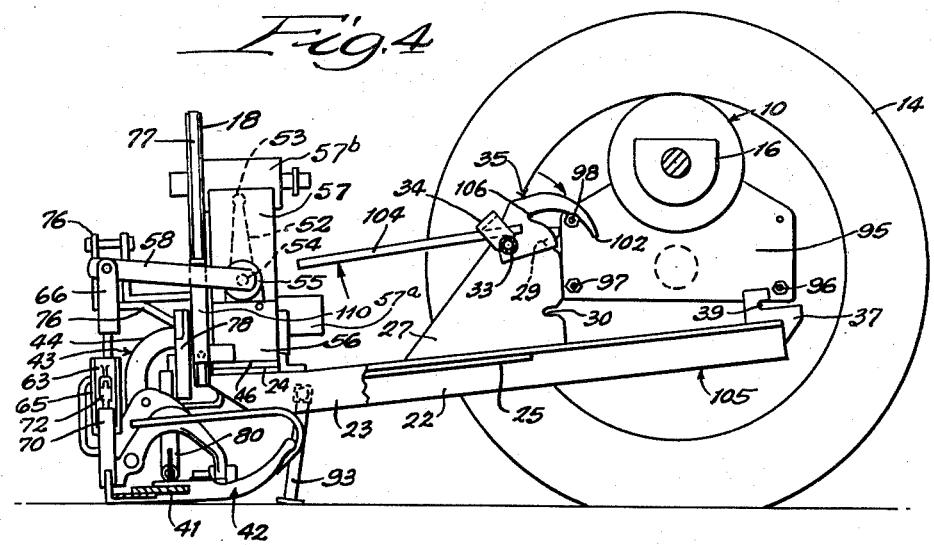
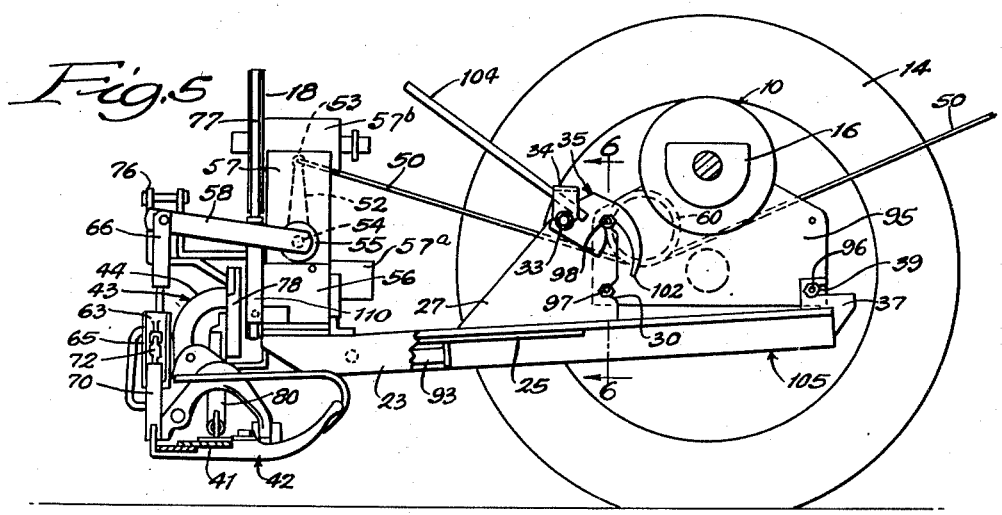
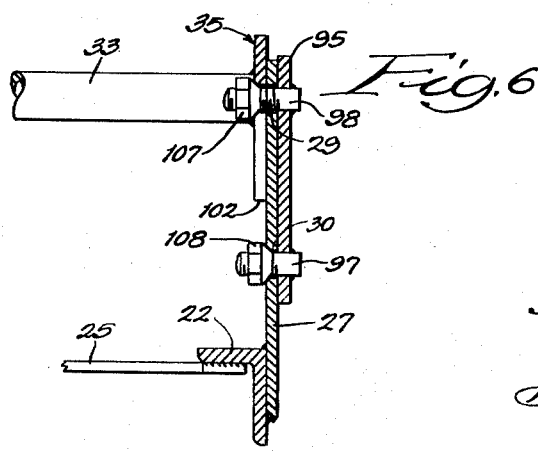
Inventor:
Rex B. Hitchcock,
By Paul O. Pippel
Attorney.

Patented Dec. 12, 1950

2,533,804

UNITED STATES PATENT OFFICE 2,533,804

TRACTOR MOWER HITCH

Rex B. Hitchcock, Evanston, Ill., assignor to International Harvester Company, a corporation of New Jersey Application September 11, 1944, Serial No. 553,582

11 Claims. (Cl. 56—25)

This invention relates to a new and improved tractor mower and has for one of its principal objects the provision of means for quickly and easily attaching a mower to a tractor.

An important object of this invention is to provide hoisting means on a mower adapted to cooperate with a fixed part of a tractor and thereupon be capable of raising the mower to operating position.

Another important object is the provision of a novel mower frame on which are supplied cammed hooks capable of cooperating with projections on a tractor, thereupon lifting the mower and its frame to a proper operating position with respect to the tractor, and further means for rigidly holding the mower in its operating position.

A still further important object is to provide a manually rotatable element on a mower which is capable of raising and locking the mower in position on a tractor.

Other and further important objects of this invention will become apparent from the following specification and accompanying drawings, in which:

Figures 4 and 5 are successive views similar to Figure 3, showing in detail the lowered uncoupled and raised coupled or mounted positions of the mower relative to the tractor;

Figure 6 is a sectional view taken on the line 6—6 of Figure 5; and

As shown in the drawings:

Figure 1:
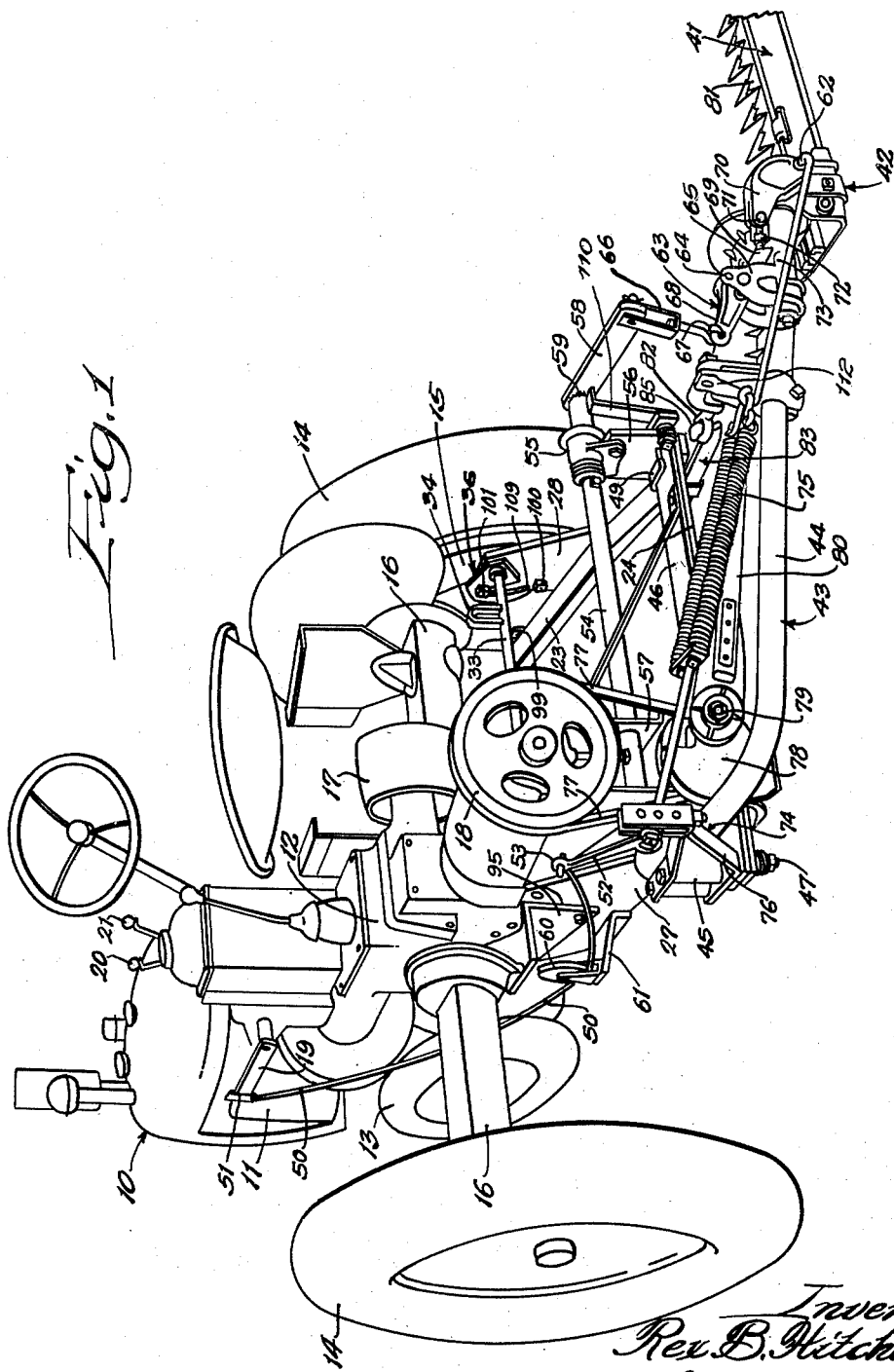
Figure 1 is a perspective view of the tractor mower of this invention.

The reference numeral 10 indicates generally a tractor especially adapted for agricultural use and capable of having implements mounted thereon for cultivating and harvesting or the like. The tractor 10 consists of an engine 11, a chassis 12, forwardly mounted dirigible wheels 13, and a pair of relatively widely spaced rear traction wheels 14. The wheels 14 are mounted on depending axle housings 15 supported by a transverse housing 16, which carries the drive from the engine to the wheels 14 through the customary transmission and differential.

Agricultural tractors of the modern type are equipped with several forms of power take-off devices. One of these power take-off devices is in the form of a wide belt pulley 17. This wide belt pulley is generally used for driving stationary machines, such as feed grinders or stationary threshers or the like. A second power take-off device is a V-belt pulley 18 which in this case is utilized to drive the mower sickle. A third power take-off device is an arcuately shiftable rock-arm 19 positioned at the side of the engine 11. This is customarily a hydraulically operated arm, and as shown in Figure 1 a hand lever 20 is capable of effecting desired movement of the arm 19 through the medium of suitable valves and pumps, not shown. The rock arm 19 is generally duplicated on both sides of the tractor engine, and these arms are usually operable separably as indicated by the second hand lever 21. Many uses for these power-operated rock-arms are found in the effective adaptation of agricultural implements to tractors. They are used to raise and lower cultivating implements, and in the present case one of these arms is used to effect a raising or a lowering of the mower cutter-bar, as disclosed and claimed in Patent No. 2,517,384, August 1, 1950, to Bernard E. Brown, assigned to the present assignee.

Figure 2:
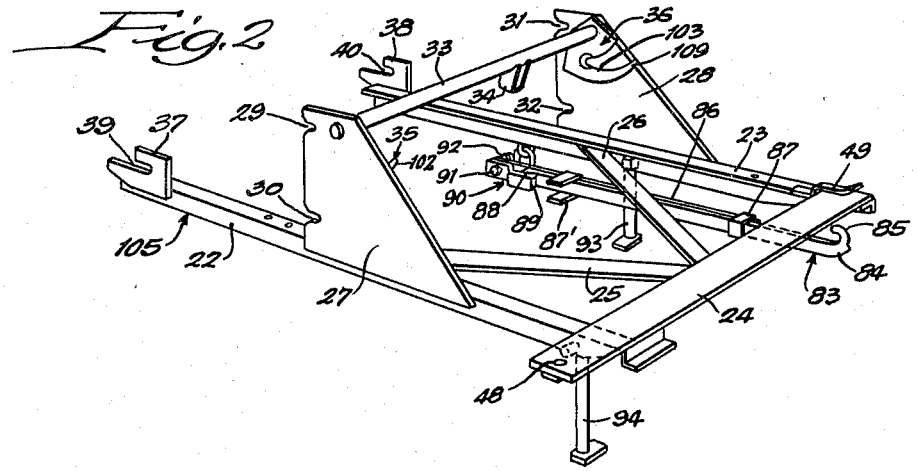
Figure 2 is a perspective detail of the mower frame of this invention.

The mower main frame structure, as best shown in Figure 2, includes a pair of spaced longitudinal beams 22 and 23. These beams 22 and 23 are joined by a transverse beam 24 and reinforcing members 25 and 26. Each of the longitudinal beams has upwardly extending brackets 27 and 28 respectively. The forward ends of these brackets 27 and 28 are equipped with wide-mouthed notches 29, 30, 31, and 32. A rod-like cross-shaft 33 extends between the brackets 27 and 28 and is journally mounted in suitably alined apertures in these brackets. A U-shaped bail member 34 is welded or otherwise fastened to the rod 33 and is capable of rotation with the rod. Hook members 35 and 36 are fixedly attached for rotation with the rod-like shaft 33 and are placed closely adjacent the inner faces of the brackets 27 and 28 respectively. Mounted at the forward ends of the longitudinal beams 22 and 23 are brackets 37 and 38 which are equipped with notches 39 and 40 respectively.

The mower itself includes a cutter-bar 41, a shoe 42 about which the cutter-bar 41 hinges, and an auxiliary frame 43 which supports the cutter-bar and shoe 41 and 42. The auxiliary frame 43 consists of an L-shaped tubular member 44, which is hinged for vertical movement about a horizontal axis within a housing 45, and a flat plate-like cross-member 46 which is hinged for horizontal movement about a vertical axis through a hinge member 47. The plate member 46, as shown in Figure 1, normally rests directly on the transverse beam 24 of the main mower frame. The vertical hinge member 47 is adapted to extend through the aperture 48, shown in Figure 2 of the drawings, in one end of the crossbeam 24. The other end of the beam 24 has a guide member 49 associated therewith so that rearward swinging of the plate 46 horizontally will be readily permitted and a return swinging of the plate 46 to its normal position may be easily accomplished through the medium of the guide 49. The housing 45 is mounted directly above the hinge 47 and is movable with the plate 46.

A cable 50 is attached to the shiftable end of the rock-arm 19 at 51 and at its other end is fastened to an upwardly extending lever arm 52 at 53. The lever 52 is fixedly attached to a crossshaft 54 which is journaled in a bearing 55 which in turn is mounted upon an upward extension 56 of the transverse plate member 46. The crossshaft 54 is further journaled in a bracket 57. The bracket 57 includes a lower bearing portion 57a and an upper bearing portion 57b, the latter of which journals the shaft that carries the V-belt pulley 18. The function of the bearing 57a will appear later in connection with the description of the drive for the mower. A lever arm 58 is mounted on the far end of the cross-shaft 54 and is preferably welded thereto as shown at 59. Rotational movement of the lever arm 52 causes simultaneous rotation of the shaft 54 and thus also the lever arm 58. The cable 50 passes beneath the axle housing 16, and by means of a pulley 60 mounted on a bracket 61 beneath the tractor is capable of effecting a smooth uninterrupted pulling action between the power lift arm 19 and the lever arm 52 on the auxiliary mower frame 43.

As the lever arm 58 is raised by operation of the power lift arm 19, the cutter-bar 41 is raised about the hinge 62 within the shoe 42. This is accomplished by means of a cradle-like lever 63 which is centrally pivoted at 64 on brackets 65 forming part of the shoe 42. A link 66 joins the arm 58 with the cradle lever 63 at 67, and an upward movement of the arm 58 causes a similar upward movement of the end 68 of the cradle lever 63 and a downward movement of the end 69 of the cradle lever 63. A curved arm 70 rigidly mounted with respect to the cutter-bar 41 and mounted directly on the hinge 62 is joined by its innermost extension at 71 to the end 69 of the cradle lever 63 through the medium of a link 72. Continued movement of the power lift arm 59 will effect a maximum raising of the cutter-bar 41 to a position where it is approximately at an angle of 15° with respect to the ground. This limit is determined by the end 69 of the cradle lever 63 striking a raised portion 73 on the shoe 42 thereby prohibiting further upward movement of the cutter-bar 41 separately from the auxiliary frame 43. Further movement of the power lift arm 19 in the same direction will now effect vertical movement of the L-shaped beam 44 and the cutter-bar 41 as a unit about a hinge 74 on a horizontal axis within the housing 45. The structure in this respect may be similar to that shown in the United States Patent to Crumb 1,977,429. A counter-balancing spring 75 is extended between the shoe 42 of the mower and an upwardly extending bracket 76 from the housing 45. The spring 75 assists in the lifting of the mower.

Figure 3:
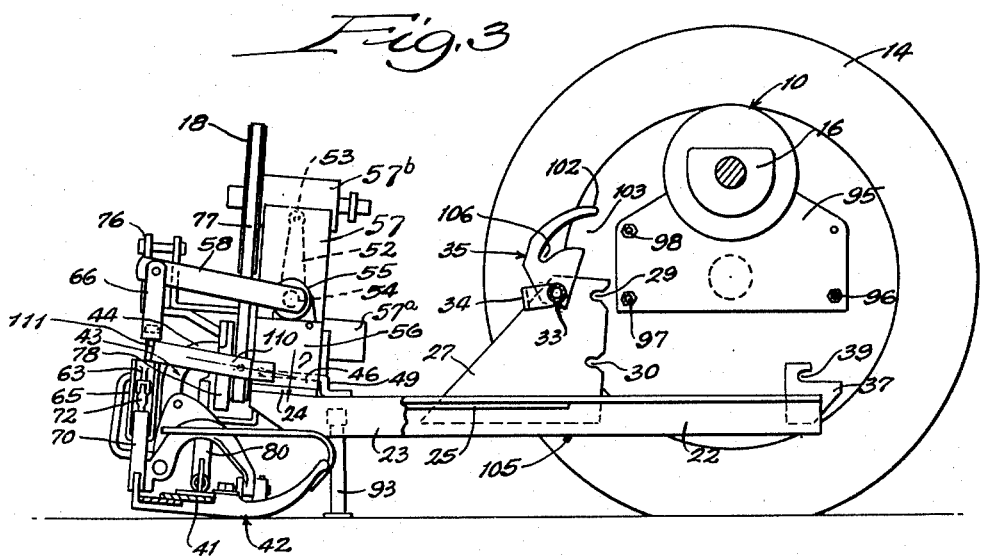
Figure 3 is a sectional view of the tractor mower in position prior to mounting on the tractor.
Figure 7:
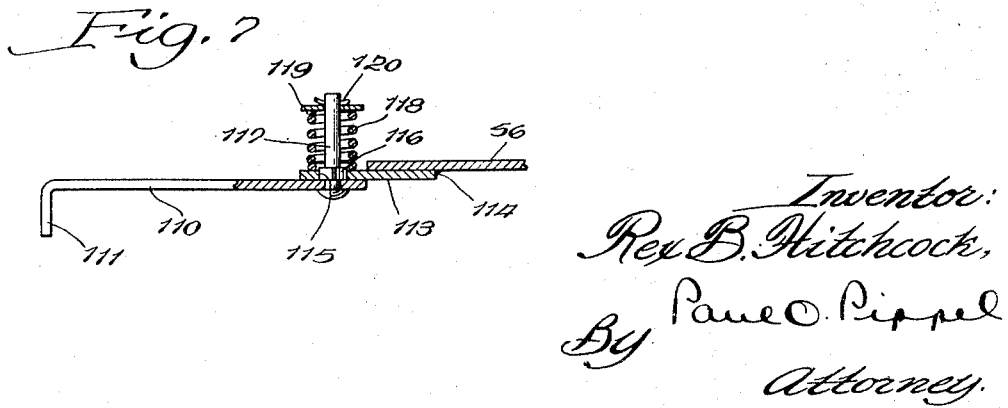
Figure 7 is a sectional view taken on the line 7 of Figure 3.

The pulley 18, by means of a V-belt 77, is adapted to drive a fly-wheel 78 on which is mounted a crank 79 for operating a pitman 80. The flywheel 78 is carried on a shaft (not shown) journaled in the lower bearing 57a of the bracket 57 (Figures 3, 4 and 5). Since the bracket 57 is carried by the frame member 56, the flywheel 78 and pulley 18 are carried with the cutting mechanism as it swings rearwardly when released. The construction may be like that shown in the United States patent to MacDonald 2,269,980. The mower cutter-bar 41 includes a sickle 81 which is reciprocated by the pitman 80.

In operating the tractor mower through fields or the like, it is possible that the cutter bar will meet some obstruction which would tend to cause damage to the entire mower if there were not some safety release means. As previously stated, the mower and auxiliary frame are capable of swinging horizontally rearwardly about the vertical hinge 47. The shoe or yoke portion 42 of the mower includes a forward apertured projection 82 which is hooked to an extensible safety release mechanism 83. This device 83 is best shown in Figure 2 and includes a slidable member 84 having a hook portion 85 which extends through the aperture in the projection 82 on the mower. A second relatively stationary arm 86 lies closely adjacent the slidable arm 84 and is equipped with brackets 87 and 87' which form a guide for the slidable arm 84. This slidable arm has an outward projection 88 at its end having an inclined surface at its rearward end which is engaged by a hook portion 89 of a spring-held latch or the like 90. The latch member 90 is bolted to the stationary arm 86 by means of a bolt 91 and includes a spring 92 which permits relative movement between the latch 90 and the arm 86. The inner surface of the hook 89 has an angular surface corresponding to the inclined surface of the projection 88 of the slidable arm 84. The size and strength of the spring 92 determine when the cutter-bar will release and swing about the hinge 47. Assuming that the cutter-bar does strike an obstruction, a force will be applied to the hook 85 of the slidable arm 84, and if it is sufficiently strong it will cause the latch member 90 and its over-lying hook 89 to yield outwardly overcoming the spring 92, thus permitting the arm 84 to slide rearwardly until such time as the projection 88 strikes the guide bracket 87.

The mower frame structure, as shown in Figure 2, is provided with retractable legs 93 and 94. These two legs with the shoe of the mower 42 provide suitable support for the frame, when the mower is detached from the tractor, whereby it stands in a relatively level position without other support.

The tractor on which the mower is mounted may be any one of several types such as the wide tread wheel tractor shown in the drawings. Other tractors have relatively narrower spacing between the rear traction wheels, and as it is desired to have the mower adaptable to all types and sizes of tractors, the longitudinal beams 22 and 23 of the mower frame are spaced only as far apart as the spacing between the traction wheels of the narrowest tractor. However, with the tractor shown, the wheel spread is much greater than the spacing between the frame beams 22 and 23, and it has been necessary to provide a plate 95 which is rigidly mounted on the housing 16 and depends therefrom in a manner similar to that of the depending axle housing 15. Projecting threaded bolt studs 96, 97, and 98 are positioned on the depending plate 95 and correspond in position to the slots 38, 39, and 29 in the brackets 37 and 27 of the main mower frame. Similar bolt studs are provided on the depending axle housing 15 and are shown at 99, 100, and 101 in Figure 1.

As shown in Figures 2 and 3, the mower and frame are standing in a level position on their legs 93, 94, and the mower shoe 42.

In order that the mower shoe will not collapse when it is being used as a third supporting leg, a lock is provided to prevent the mower from swinging upwardly about its hinge. The lock is in the form of a hinged arm 110 which has a bent-over portion 111 adapted to hold down a standard 112 fixed on the tubular member 44 during the period of mounting the mower on the tractor, as shown in Figure 3. An arm 113 is welded to the plate-like extension 56 at 114 for the purpose of supporting the hinged arm 110. The stationary arm 113 is provided with a square socket 115 which is adapted to receive a squared projection 116 on a pin 117 supporting the hinged arm 110. A spring 118 superposes the pin 117 and is retained by a washer 119 and a cotter pin 120. When the mower is mounted on the tractor this arm 110 is kept in its vertical position about the hinge pin 117. However, when the mower is removed from the tractor and it is necessary that the mower stand on its own supports, the arm 110 is pulled outwardly away from the stationary arm 113 until such time as the square projection 116 is released from the square socket 115 and the arm is free to be rotated. The arm 110 is swung rearwardly to the position as shown in Figure 3, and it is locked in this position by the square projections again entering the socket 115. It will be evident that in such a position the mower is prevented from raising about its hinges, and as a result thereof it is prevented from collapsing.

The tractor is backed into a position wherein the rear wheels and the supporting bolt studs are in a position such as shown in Figure 3. The most difficult problem of getting the implement mounted on a tractor is the raising of the implement to its operating position on the tractor. It is, of course, possible to use an ordinary jack and effect a raising of the frame parts until they are at a height in line with the supporting studs or brackets used as the means of attaching. In the present device, this tedious job of raising the implement into position on the tractor has been eliminated. The cammed hook 35 is provided with a relatively high extending curved finger 102 which forms the outline for a wide-mouthed opening 103 in the member 35. As previously stated, the member 35 rotates with the cross-shaft 33 as does the bail member 34. As best shown in Figure 4, a lever in the form of a rod 104 is inserted between the shaft 33 and the bail member 34 so that a lifting of the lever 104 will effect a rotation of the shaft 33 and likewise a rotation of the hook member 35. The upwardly extending finger 102 is adapted to encircle the bolt stud 98. As the shaft 33 is further rotated, the finger 102 causes a lifting of the mower frame 105 until the bolt stud 98 reaches the innermost end 106 of the wide-mouthed slot 103. Figure 4 shows the main frame of the mower 105 being lifted by means of the rotating hook 35. Figure 5 shows the completely mounted position of the mower on the tractor wherein the studs 96, 97, and 98 engage the slots 39, 30, and 29. In such position the nuts on the bolt studs are tightened thus holding the mower in fixed position on the tractor. The end of the slot 106 is the same distance from the rotating shaft 33 as is the slot 29 so that when the hook member 35 is completely rotated, the slots 29 and 106 are coincident, as they are shown in Figure 5 of the drawings. Figure 5 also shows the upward retraction of the leg 93 along the main frame beam 23. Figure 6 shows a sectional view through the mower attaching means and more distinctly shows the arrangement of the bolt studs 98 and 97 along with their tapered nuts 107 and 108. The hook member 35 is shown over the bolt stud 98 as well as the bracket 27.

It will be evident that herein is provided an implement which is quickly attachable to a tractor upon the exertion of a minimum effort by an operator. The hook 35 and its raising finger 102 are duplicated on the other side of the frame by the hook 36 and its upwardly extending curved finger 109 so that when the lever 104 causes rotation of the shaft 33, both fingers 102 and 109 reach up and grip the bolt studs 98 and 101 respectively. It is, of course, possible that modifications may be developed which would also be readily operable and adaptable to commercial use, and with that in mind it is intended only to limit the invention within the scope of the appended claims.

What is claimed is:

1. In an implement and carrying frame unit of the type in which the implement is separably associated with the carrying frame for attachment thereto and detachment therefrom and in which the implement has an attachment part positionable to receive a complementary attachment part on the carrying frame and wherein the attachment parts are movable relative to each other to effect attachment and detachment of the implement and carrying frame; means for effecting attachment and detachment of said parts, comprising a hook rockable on an axis on the implement part independently of said implement part and a hook-receiving member on the carrying frame, the hook having a cam surface engageable with the member and so related to the hook axis as to move the parts relatively when rocked to attach the implement part to the carrying frame.

2. In an implement and carrying frame unit of the type in which the implement is separably associated with the carrying frame for attachment thereto and detachment therefrom and in which the implement has an attachment part positionable to receive a complementary attachment part on the carrying frame and wherein the attachment parts are movable relative to each other to effect attachment and detachment of the implement and carrying frame; means for effecting attachment and detachment of said parts, comprising a hook rockable on an axis on the implement part independently of said implement part and a hook-receiving member on the carrying frame, the hook having a cam surface engageable with the member and so related to the hook axis as to move the parts relatively when rocked to attach the implement part to the carrying frame, and means for rocking the hook to engage and disengage the hook-receiving member.

3. In an implement and carrying frame unit of the type in which the implement is separably associated with the carrying frame for attachment thereto and detachment therefrom and in which the implement has an attachment part positionable to receive a complementary attachment part on the carrying frame and wherein the attachment parts are movable relative to each other to effect attachment and detachment of the implement and carrying frame: means for effecting attachment and detachment of said parts, comprising a pair of members, one connected to each part, means mounting one member on the implement part for movement with respect thereto and for movement with respect to the other member, means on the movable member providing a cam portion constructed and arranged to engage the other member for shifting the implement and carrying frame parts relatively when the movable member is moved relative to the other member.

4. In an implement and carrying frame unit of the type in which the implement is separably associated with the carrying frame for attachment thereto and detachment therefrom and in which the implement has an attachment part positionable to receive a complementary attachment part on the carrying frame and wherein the attachment parts are movable relative to each other to effect attachment and detachment of the implement and carrying frame: means for effecting attachment and detachment of said parts, comprising a first member rockably carried by the implement part, a second member on the carrying frame part, means on the first member providing a cam surface cooperable, when the first member is rocked, with the second member to ride over the second member for moving the carrying frame part and implement parts relatively.

5. In an implement and carrying frame unit of the type in which the implement is connectible to and separable from the carrying frame by means including a part on the implement carried by a complementary part on the carrying frame when the carrying frame and implement are connected and wherein the implement when separated from the carrying frame is supported on the ground with its implement part at a height below that of the carrying frame part: means for effecting connection and separation of the carrying frame and implement via the aforesaid parts, comprising a first connecting element on the carrying frame part, a second connecting element on the implement part and movable with respect thereto and with respect to the first element and including a portion extending to a height corresponding to that of the first element, means including said portion and forming generally a cam surface engageable with the first element having another portion disposed at a different height, and means for moving the second element with respect to the first element and implement part whereby said portions successively engage the first element and move the implement part vertically relative to the carrying frame part engageable with the tractor part for raising the carrying frame implement part with respect to the tractor part.

6. In an implement and carrying frame unit of the type in which the implement is connectible to and separable from the carrying frame by means including a part on the implement carried by a complementary part on the carrying frame when the carrying frame and implement are connected and wherein the implement when separated from the carrying frame is supported on the ground with its implement part at a height different from that of the carrying frame part: means for effecting connection and separation of the carrying frame and implement via the aforesaid parts, comprising a first connecting element on the carrying frame part, a second connecting element on the implement part and movable with respect thereto and with respect to the first element and including a portion extending to a height corresponding to that of the first element, means including said portion and forming generally a cam surface engageable with the first element having another portion disposed at a different height, and means for moving the second element with respect to the first element and implement part whereby said portions successively engage the first element and move the implement part vertically relative to the carrying frame part.

7. In an implement and carrying frame unit of the type in which the implement is connectible to and separable from the carrying frame by means including a part on the implement carried by a complementary part on the carrying frame when the carrying frame and implement are connected and wherein the implement when separated from the carrying frame is supported on the ground with its implement part below and rearwardly of the carrying frame part: a vertical plate on the implement having a pair of vertically spaced, forward-opening notches; means on the carrying frame part including a pair of projecting elements spaced vertically apart to correspond to the notches but disposed at higher levels than the notches; and means for connecting the carrying frame part and implement parts via said plate and projecting elements including a member rockable on the plate and having a cam portion engageable with the carrying frame part, said cam portion having such configuration as to draw the plate upwardly and forwardly so that the notches receive the projecting elements.

8. The invention set forth in claim 7, in which: the cam portion is engageable with one of the projecting elements.

9. In an implement and carrying frame unit of the type in which the implement is connectible to and separable from the carrying frame by means including a part on the implement carried by a complementary part on the carrying frame when the carrying frame and implement are connected and wherein the implement when separated from the carrying frame is supported on the ground with its implement part at a height different from that of the carrying frame part; means for effecting connection and separation of the carrying frame and implement via the aforesaid parts comprising a first pair of connecting elements on the carrying frame part, a second pair of connecting elements on the link element part and movable with respect thereto and with respect to the first pair of elements and including first portions extending to a height corresponding to that of the first pair of elements, means including said first portions and forming generally cam surfaces engageable with the first pair of elements having second portions disposed at a different height, and means for moving the second elements with respect to the first pair of elements and implement part simultaneously whereby said first and second portions successively engage the first elements and move the implement part vertically relative to the carrying frame part, said means including a member connected between the second elements.

10. In an implement and carrying frame unit of the type in which the implement is connectible to and separable from the carrying frame by means including a part on the implement carried by a complementary part on the carrying frame when the carrying frame and implement are connected and wherein the implement when separated from the carrying frame is supported on the ground with its implement part at a height different from that of the carrying frame part; means for effecting connection and separation of the carrying frame and implement via the aforesaid parts, comprising a first pair of connecting elements on the carrying frame part, a second pair of connecting elements on the implement part and rockable with respect thereto and with respect to the first pair of elements and including first portions extending to a height corresponding to that of the first pair of elements, means including said first portions and forming generally cam surfaces engageable with the first pair of elements having second portions disposed at a different height, and means for simultaneously rocking the second elements with respect to the first pair of elements and implement part whereby said first and second portions successively engage the first elements and move the implement part vertically relative to the carrying frame part, said means including a rock-shaft connected between the second elements.

11. The invention set forth in claim 10, in which: the rock-shaft includes socket means at one end thereof constructed and arranged to receive a lever or the like for rocking the rock-shaft.

REX B. HITCHCOCK.

REFERENCES CITED

The following references are of record in the file of this patent:

UNITED STATES PATENTS

| Number | Name | Date |
| --- | --- | --- |
| 1,943,284 | Binan | Jan. 16, 1934 |
| 2,129,435 | Morris | Sept. 6, 1938 |
| 2,187,981 | Martin | Jan. 21, 1940 |
| 2,252,691 | Arndt | Aug. 19, 1941 |
| 2,259,892 | Hyman | Oct. 21, 1941 |
| 2,259,893 | Hyman | Oct. 21, 1941 |
| 2,347,871 | Andrews et al. | May 2, 1944 |
| 2,368,290 | Donald | Jan. 30, 1945 |
| 2,376,539 | Hitchcock et al. | May 22, 1945 |
| 2,376,541 | Johnson et al. | May 22, 1945 |